United States Patent [19]

Coughlin

[11] Patent Number: 4,963,600

[45] Date of Patent: Oct. 16, 1990

[54] CHROMA NEUTRALIZATION OF CLEAR COATS BY ADDING PIGMENT DISPERSIONS

[75] Inventor: Joseph F. Coughlin, Moberly, Mo.

[73] Assignee: E. I. du Pont de Nemours and Company, Wilmington, Del.

[21] Appl. No.: 287,855

[22] Filed: Dec. 19, 1988

[51] Int. Cl.⁵ .............................................. C08J 3/20
[52] U.S. Cl. ................................. 523/333; 523/334; 524/1; 524/88; 524/560; 106/228; 106/241; 106/902; 106/903; 106/904
[58] Field of Search ...................... 524/560, 88, 1; 523/170, 171, 333, 334; 106/902, 903, 904, 34, 228, 241

[56] References Cited

U.S. PATENT DOCUMENTS

| | | | |
|---|---|---|---|
| 3,953,643 | 4/1976 | Cheung et al. | 525/329.9 |
| 4,148,646 | 4/1979 | Zweig | 430/172 |
| 4,168,249 | 9/1979 | Meyer | 260/16 |
| 4,181,785 | 1/1980 | Chattha et al. | 525/161 |
| 4,208,465 | 6/1980 | Chang | 428/416 |
| 4,273,690 | 6/1981 | Walus | 260/22 |
| 4,355,071 | 10/1982 | Chang | 428/334 |
| 4,389,502 | 6/1983 | Fry et al. | 524/37 |
| 4,402,983 | 9/1983 | Craven | 428/335 |
| 4,452,945 | 6/1984 | Bowen et al. | 525/162 |
| 4,463,038 | 7/1984 | Takeuchi et al. | 427/407 |
| 4,499,143 | 2/1985 | Panush | 428/336 |
| 4,522,971 | 6/1985 | DeBergalis | 524/547 |
| 4,577,007 | 3/1986 | DeBergalis | 526/321 |
| 4,585,693 | 4/1986 | DeBergalis | 428/324 |
| 4,598,015 | 7/1986 | Panush | 428/324 |
| 4,636,431 | 1/1987 | DeBergalis | 428/327 |
| 4,679,794 | 7/1987 | Yamada et al. | 273/235 R |
| 4,679,795 | 7/1987 | Melvin et al. | 524/908 |
| 4,716,060 | 12/1987 | Rajadhyaksha et al. | 106/34 |
| 4,814,016 | 5/1989 | Adkins et al. | 106/34 |

FOREIGN PATENT DOCUMENTS

| | | |
|---|---|---|
| 0148718 | 7/1985 | European Pat. Off. . |
| 0169796 | 1/1986 | European Pat. Off. . |
| 60-18223 | 1/1985 | Japan . |
| 60-59785 | 3/1986 | Japan . |

OTHER PUBLICATIONS

Ciba-Geigy, A-181A3M91, Ciba-Geigy Corporation, 1981.

*Primary Examiner*—Allan M. Lieberman
*Attorney, Agent, or Firm*—John M. Lynn

[57] ABSTRACT

A method for minimizing the inherent yellowness of any kind of clear coating is disclosed. This method involves the addition of very small amounts of blue pigments or dyes to the clear coating so that chroma neutralization occurs. The chroma neutralization results in a clear coat which is crystal clear in appearance.

3 Claims, 3 Drawing Sheets

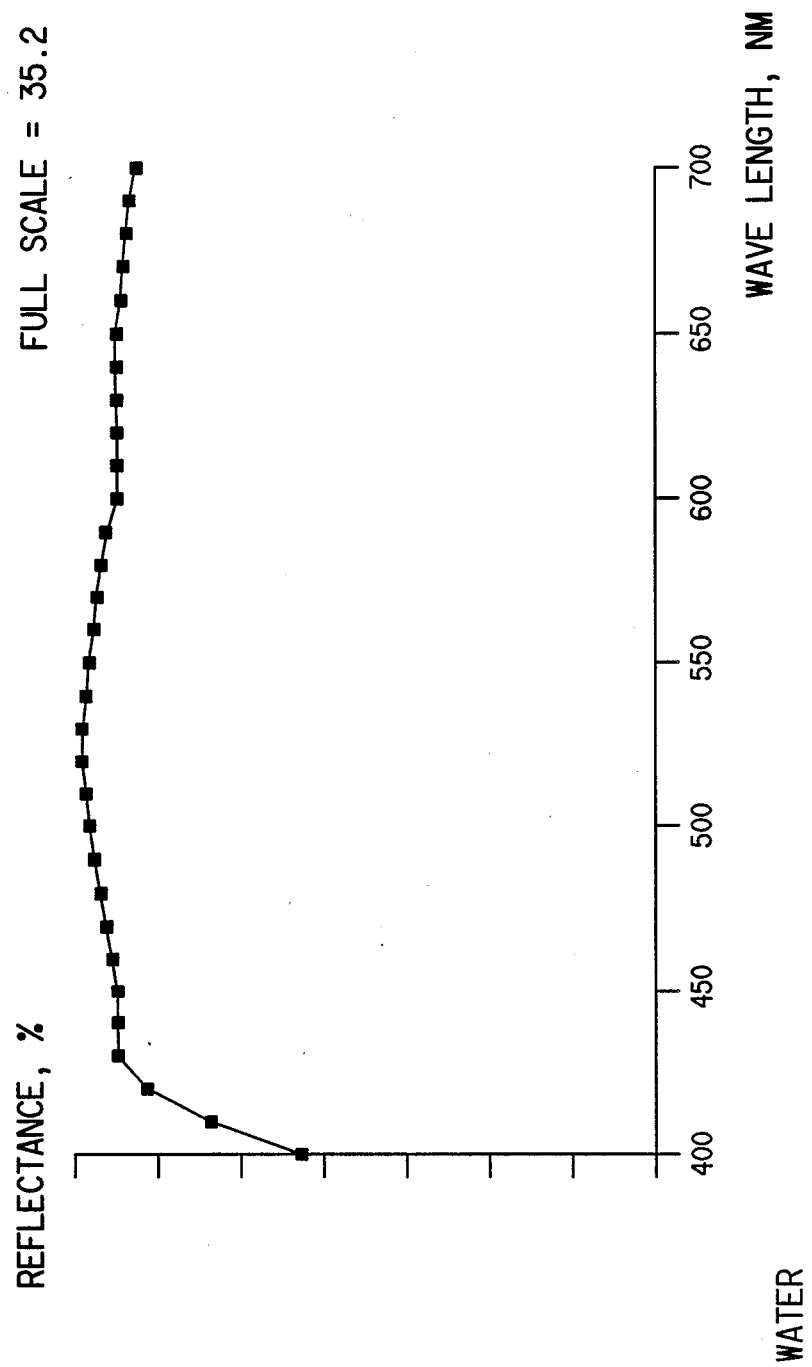

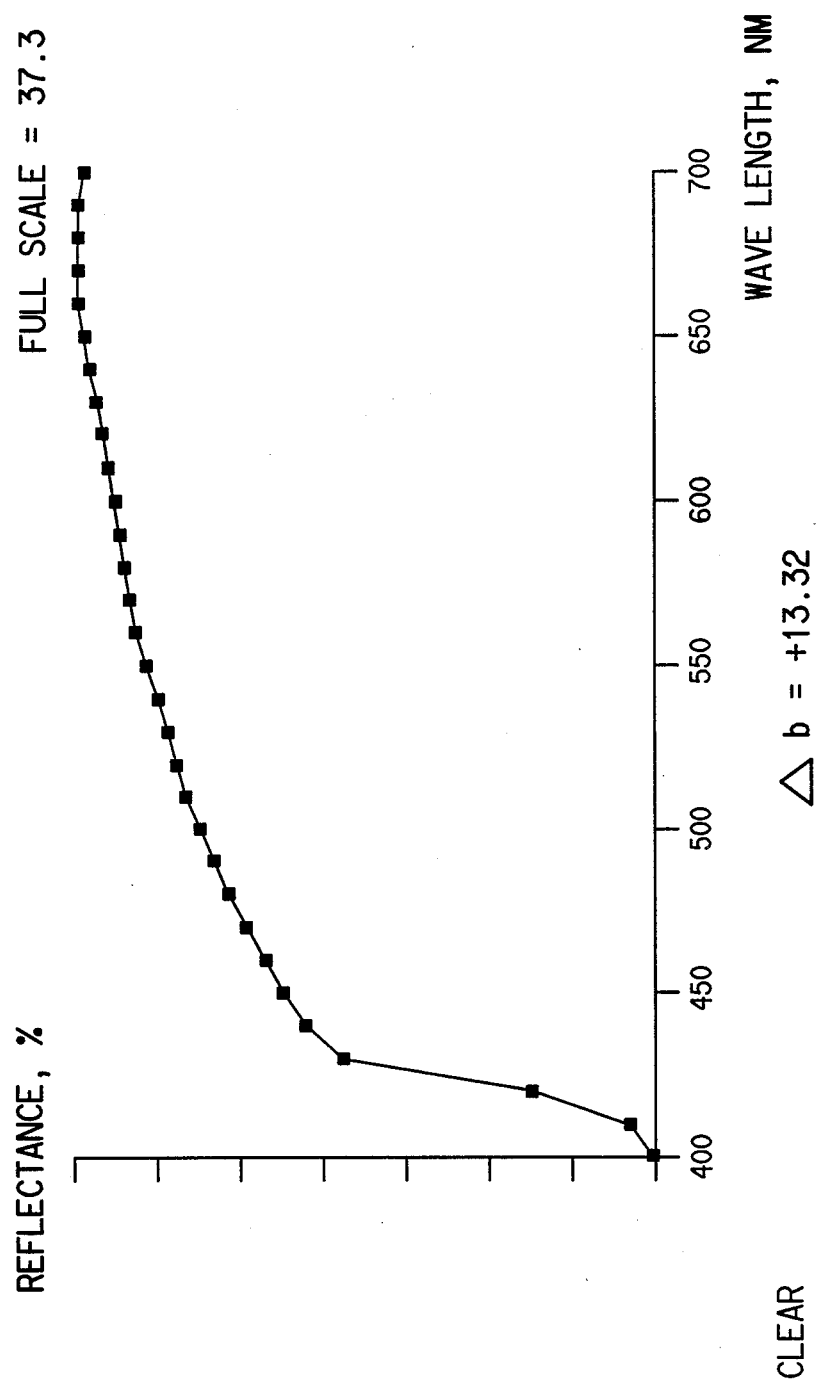

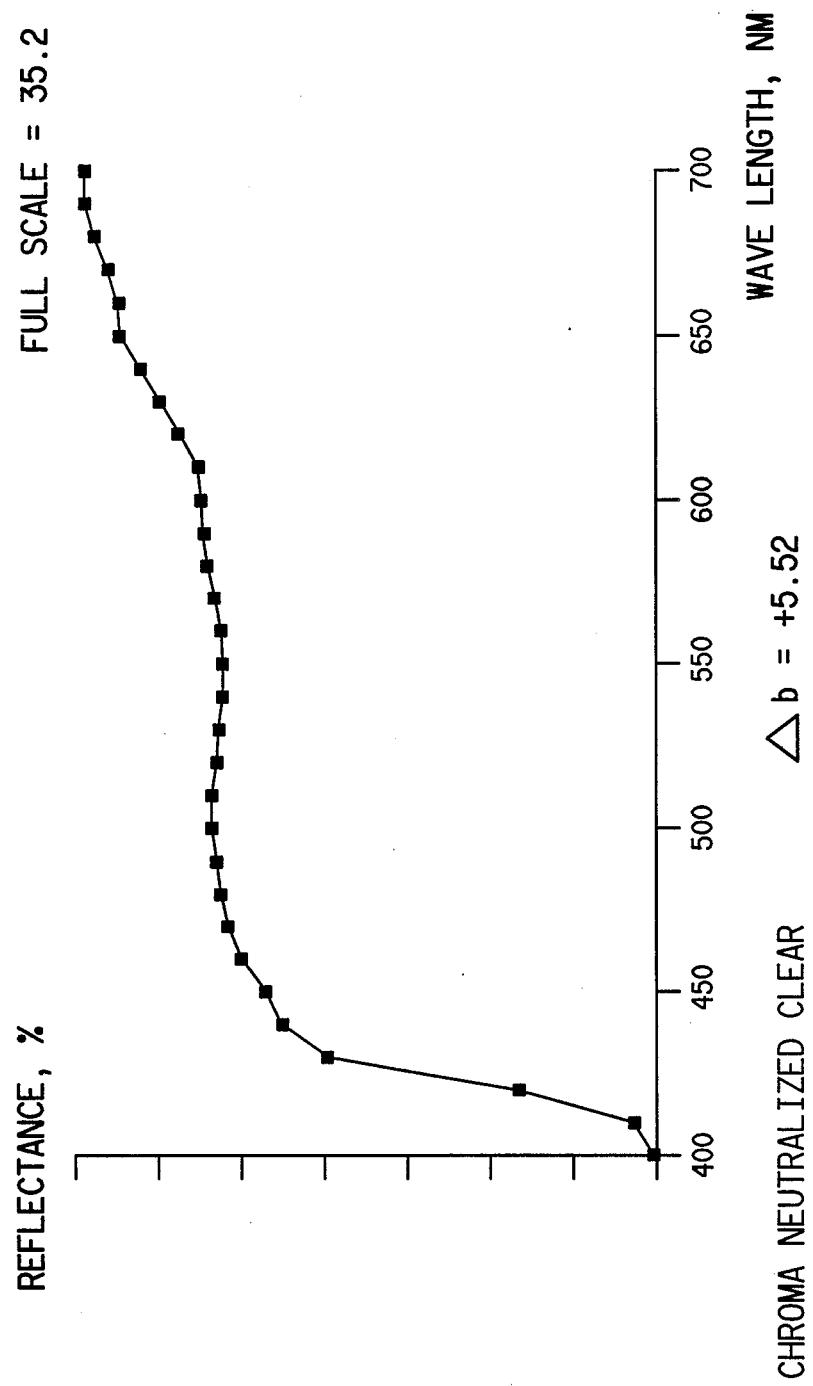

CHROMA NEUTRALIZATION OF CLEAR COATS BY ADDING PIGMENT DISPERSIONS

BACKGROUND OF THE INVENTION

Much of the research and development effort in the field of automotive finishes is currently directed to the development of color coat/clear coat paint systems. It has been found that an excellent appearance, with depth of color and with metallic glamour, can be obtained by applying a clear coat over a pigmented coat. Minimal visual color of clearcoats is considered by users to be an important attribute of color coat/clear coat paint systems. Unfortunately, the excessive yellowness of many automotive clear coats in the can as well as on the substrate has always been a problem which has never been solved successfully.

The most obvious color problems resulting from having a clear coat which is amber or yellow occur when the clear coat is used over white color coats. This results in a final color which is either too creamy or perhaps light tan instead of the desired white. Other less obvious color problems occur on silver color coats, where the final color becomes too gold, or on light blue color coats, where the result becomes greenish. These color problems are more apparent away from fluorescent light, which has blue wavelengths that cancel some of the yellow tones. Unfortunately, outdoor light has what artists call a "warmer" tone, rich in red and yellow wavelengths, that tends to bring out a yellow cast in a clearcoat job. The color problem is also accentuated at higher film builds or when viewed from a grazing angle (sidetone) since the light has more clearcoat to travel through. Prior to the use of base coat/clear coat systems for the automotive industry the issue of excessive color in clear coats was not as important because the film thickness of the clear was minimal. Current clear film builds are 1.5 to 2.0 mils or more. In the past the clear film builds were typically less than 0.5 mils.

Our novel method of adding small amounts of blue or violet pigment to the clear creates an unprecedented level of clarity in the clear coat and eliminates all the disadvantages of the yellowing clears described above.

The use of pigment in a clear coat used over a base coat has been tried before. However, our reasons for adding the pigment to the clear, and the ratio of pigment to binder are completely different. For instance, in the past pigment has been added to clear for the following reasons: (1) using the pigment in the clear as an ultraviolet light absorber to help protect the coating; (2) using the pigment in the clear to supplement the color in the base coat; and (3) using the pigment in the clear for the aesthetic effect intrinsic to the pigment used (i.e. actually coloring the clear rather than using it for chroma neutralization). Our invention is novel in its use of pigment in the clear to neutralize the chroma intrinsic in many clear products, such as the yellowness of many polymeric clears. Below are brief summaries of the patents in the prior art.

The Panush patents (U.S. Pat. Nos. 4,449,143; 4,598,015 and EP No. 169-796) are specific to encapsulated mica pigments. EP No. 148-718 discloses a broader range of pigments but has a relatively high pigment to binder ratio of 0.2/100. The purpose of the pigmentation in all these patents is to actually produce color effect in the clear, or to protect the paint system from ultraviolet light.

The Meyer (U.S. Pat. No. 4,168,249) and Walus (U.S. Pat. No. 4,273,690) patents disclose basic resin compositions that could be used for clears. They further disclose adding pigments to these resins to make paint in a conventional manner. The pigments are to be used at a relatively high pigment to binder ratio of at least 1/100. The purpose of pigmentation is not for chroma neutralization.

The Chang patents (U.S. Pat. Nos. 4,208,465 and 4,355,071) specifically claim antioxidant and ultraviolet light stabilizers and inorganic siliceous pigments of refractive index 1.4–1.6. The pigments are added to protect the paint from degradation, not for chroma nuetralization.

The Fry et al patent (U.S. Pat. No. 4,389,502) claims adding pigments for mechanical or rheological properties. The pigment must have a refractive index similar to that of the film forming constituents used in the clear. Other pigmentation is claimed only when the composition is employed other than as a clearcoat of a clearcoat/color coat finish and the minimum pigment to binder ratio is 1/100. This also is true of the Craven patent (U.S. Pat. No. 4,402,983).

The DeBergalis patents (U.S. Pat. Nos. 4,522,971; 4,577,007; 4,585,693 and 4,636,431) claim compositions which have pigments which are highly ultraviolet light absorbing.

Patent JA No. 53055348 assigned to Kansai claims pigmentation at a pigment to binder ratio of at least 1:100. At these pigment to binder ratios you no longer have a clear coat.

Patent JA No. 56115664 assigned to Dainippon claims use of non-yellowing type polyisocyanates but does not claim pigmentation.

BRIEF DESCRIPTION OF THE DRAWINGS

FIG. 1 shows the spectral curve of water.

FIG. 2 shows the spectral curve of a typical lacquer acrylic clear coat prior to chroma neutralization.

FIG. 3 shows the spectral curve of the same clear in FIG. 2 after chroma neutralization.

DETAILED DESCRIPTION

Our invention relates to a process of introducing very small amounts of blue pigments in the form of pigment dispersions as chroma neutralizers to a clear to eliminate the inherent yellow color in the clear. The blue pigments can be neutral blue (true blue) or green blue or red blue (violet) tones.

Pigment dispersions are used universally for making paints. However, the process of using pigment dispersions in clears for chroma nuetralization purposes is new for the paint industry. To an observer looking at the clear after the pigment is added, he would not see the original yellow tint of the clear or the violet or blue color of the added pigment. The observer sees the result of the chroma neutralization which has crystal clear appearance.

A big advantage of this invention is that this method appears to be adaptable for use with any kind of clear coat composition which is based on any kind of polymer. "Clear film" is defined as a film having a binder and a carrier through which the base coat can be seen. It is preferred that the clear film be substantially colorless so that the full polychromatic and aesthetic effect of the base coat is not substantially decreased. Clear coat systems can utilize thermoplastic and thermosetting resin chemistries and the components of the clear compositions can be varied to suit the temperature tolerance of the substrate material. For example, the clear components can be formulated for air drying (i.e., ambient), low temperature cure (i.e. 150°–180° F.), or high temperature cure (i.e. over 180° F.). Any substrate material such as glass, ceramics, asbestos, wood, and plastic can be coated with clears. However, the preferred clear system of the present invention is particularly adapted for metal substrates, and specifically as an automotive base coat/clear coat paint finish system.

The film-forming binder used in the clear coat can be the same as conventional coating compositions used to finish or to refinish or repair automobiles and trucks. For instance, solvent- or water-based acrylic lacquers, acrylic dispersion lacquers, solvent- or water-based thermosetting acrylic enamels, polyester enamels, nonaqueous acrylic dispersion enamels, alkyd resin enamels, and polyurethane enamels can be used.

Typical acrylic lacquers that can be used are disclosed in Crissey and Lowell U.S. Pat. Nos. 2,934,509 and 2,934,510, both issued On Apr. 26, 1960; Godshalk, U.S. Pat. No. 2,860,110, issued Nov. 11, 1958; and Zimmt, U.S. Pat. No. 3,823,205, issued July 9, 1974.

One preferred acrylic lacquer clear composition has film-forming components of polymethyl methacrylate, copolymers of methyl methacrylate, cellulose acetate butyrate and a polyester plasticizer. This clear coat composition is disclosed in Meyer, U.S. Pat. No. 4,168,249, issued Sept. 18, 1979.

Typical acrylic dispersion lacquers that can be used are disclosed in Fryd and Lee, U.S. Pat. No. 3,660,537, issued May 2, 1972.

An aqueous dispersion lacquer composition of a binder in an aqueous medium can also be used.

A wide variety of solvent-based thermosetting acrylic enamels, consisting essentially of an acrylic polymer and a crosslinker such as an alkylated melamine formaldehyde, can also be used. Typical are those described in Parker U.S. Pat. No. 3,674,734, issued July 4, 1971.

Plasticizers, pigments and other additives conventionally used in coating compositions can be incorporated into the clear coat as required. The compositions can be reduced with conventional solvents, in solvent-based compositions, for applications such as spraying. If the compositions are aqueous, then water or water/solvent mixtures can be used.

In our invention, the clear is chromaneutralized with blue or violet pigments which are introduced in the form of pigment dispersions. Pigment dispersions are prepared by the conventional methods of dispersing pigments with resins and solvents through the utilization of commonly used dispersing equipment such as sand mills, attritors and so forth. Pigment dispersions are diluted with any of a number of different solvents. Our preferred solvent for use in the pigment dispersions to be added to the clear coat is xylene. However, as will be obvious to one skilled in the art, any of a number of different solvents could be used.

The pigments used in our invention are also well known in the prior art and are commercially available. Any of a number of different inorganic or organic pigments could be used. In particular, the use of a combination of Phthalocyanine Blue and Phthalocyanine Blue-Lake has been found to be successful. The concentration of pigment in the diluted dispersion is important because of the extremely low pigment to binder ratio in the final clear. Typical pigment concentrations in diluted dispersions (before addition to the clear) could range from 0.01% to 1.0%. Preferred concentration for violet pigments in the dispersion is about 0.03%. Preferred concentration for blue pigments in the dispersion is about 0.2%.

The concentration of the pigment in the clear is vital. The typical pigment to binder ratio in our invention is remarkably low. It ranges from about 0.0001 to 0.01 (by weight) parts of pigment to 100.0 parts of binder and preferably about 0.0005 to 0.0010 parts of pigment to 100.0 parts of binder. Addition of this extremely small amount of blue pigment acts as a chroma neutralizer of the yellow color of the clear. The end result is a visually colorless clear.

Organic dyes of any blue color and any chemistry can also be potentially used for chroma neutralization. However, we have found that dyes may chemically change at higher temperatures and thus may lose their effectiveness as chroma neutralizers. Preferred dyes are the ones of the anthraquinone family, Macrolex ® Violet and Irisol ® Blue, both available from Mobay Chemical Corporation. Dye solutions are prepared by using solvents most suitable for the particular dye (best solubility). In particular, methyl ethyl ketone is used for Macrolex ® Violet and isopropyl alcohol is used for Irisol ® Blue. Solutions are futher diluted with any typical organic solvent compatible for the particular clear chemistry. Our preferred solvent is xylene. Dye solution concentrations (before addition to the clear) typically range from about 0.1% to 0.001%. The preferred concentration is 0.01%. A combination of both dyes, Macrolex ® Violet and Irisol ® Blue has also been found to be successful.

Control of the desired appearance in the clear can be accomplished either visually or instrumentally.

If the visual approach is taken, a color standard is generated based on the acceptable visual clear appearance and the clear is chroma neutralized to this standard.

We have also developed an instrumental color control method which can be used in this invention. Our method is based on the use of any commercially available colorimeter with sufficient sensitivity. Our preferred colorimeter is disclosed in U.S. Pat. No. 4,479,718 issued 10/30/84, to Alman. This colorimeter has a removable face plate which is matched with a sampling cell. Our sampling cell is specially designed and constructed for this invention. Colorimeters have not previously been used with clear coatings because of their lack of color sensitivity. We have developed a new kind of cell that allows us to measure color in a clear coat. The body of the cell is constructed of opaque white glass and has an optically flat quartz window which is used for the color measurements. Cell construction permits measurements of about a 2-inch depth of liquid against a white background.

The basic principle behind control of color using a colorimeter is well known in the prior art. The color sprectum of a sample can be represented by three dimensional vectors known as tristimulus values. For instance the spectral curve of water measured in our above mentioned sampling cell is shown in FIG. 1. The tristimulus values L,a,b, measured on the high angle would be the goal for a "water-white" clear. FIG. 2 shows the spectral curve of the typical lacquer acrylic clear (described in Example 1) before chroma neutralization. The main difference between the spectral curves of the clear and the water is that the clear strongly absorbs in the blue (i.e. the sharp drop as you go to the left of the green peak at 550 nanometers). This gives the resulting observed yellowness of the clear. This effect is measured as $\Delta b = +13.32$. (The L, a, and b values in FIGS. 2 and 3 are measured against water).

The addition of blue pigment to the clear cannot raise the spectral reflectance to remove the blue absorption (unless one used a fluorescent pigment). A blue or violet pigment will simply absorb some yellow light to balance out the yellowness. The result is a more neutral hue (approaching water) as shown by FIG. 3. FIG. 3 shows the same clear of FIG. 2 after chroma neutralization. As is readily apparent from looking at FIG. 3 the spectral curve does not drop off sharply to the left of the green peak at 550 nanometers. The $\Delta b$ in the chroma neutralized clear is only $+5.25$.

EXAMPLES

The following examples illustrate the invention. All parts and percentages are on a parts by weight basis unless otherwise specified.

EXAMPLE 1

An acrylic lacquer clear was prepared according to the teachings of Meyer U.S. Pat. No. 4,168,249, issued Sept. 18, 1979 (discussed above). This clear has a slight inherent yellow cast. Using the instrumental L, a, and b tristimulus values it was possible to predict using a computer how much pigment needed to be added to the clear in order to obtain a nuetral hue.

Two pigment dispersions were added to the acrylic lacquer clear. The first dispersion consisted of a blue pigment (Monastral Blue BF ® from Du Pont) diluted to a 0.2% solution in xylene. The second dispersion consisted of a violet pigment (Indofast Violet ® available from Mobay Chemical Co.) diluted to a 0.03% solution in xylene.

The two pigment dispersions were added to 300 grams of the clear. 0.15 grams of the blue pigment dispersion described above was added and 1.4 grams of the violet dispersion described above was added. The chroma neutralized clear had color differences that measured $\Delta L = -8.81$; $\Delta a = +2.11$; and $\Delta b = +5.25$ versus water. Visually the resulting clear was neutral in hue with very little sign of the original yellowness.

EXAMPLE 2

An acrylic lacquer clear was prepared using the procedure of Example 1.

Two pigment dispersions were added to the acrylic lacquer clear. The first dispersion consisted of a blue pigment (Monastral Blue BF ® from Du Pont) diluted to a 0.19% solution in xylene. The second dispersion consisted of a violet pigment (Indofast Violet ® available from Mobay Chemical Co.) diluted to a 0.03% solution in xylene.

These dispersions were added to the clear in varying amounts and at various different dispersion ratios and the resulting clears were assessed for chroma neutralization by comparing them visually against water. The sample which looked the closest to water in color was selected as the best. This color had been achieved by using the above dispersions in a ratio of blue to violet of 1 to 0.43. The final concentration by weight of the total amount of pigment in the clear was 0.00026%. To an observer looking at the material after it has been treated, he neither sees yellow or blue color, but sees the result of the cancellation which is a clear with a neutral hue.

What is claimed:

1. A method for minimizing inherent yellowness in any clear film composition having a binder and a solvent or dispersion medium comprising adding a blue pigment dispersion to the clear film composition in amounts so that the quality of the pigment in the clear film composition ranges from about 0.0001 to 0.01 parts of the pigment to 100.0 parts of the binder, such that the blue pigment results in a chroma neutralization of the inherent yellowness.

2. The method of claim 1 wherein the pigment is present in the clear film composition in an amount of between 0.0005 to 0.0010 parts by weight of the pigment to 100.0 parts by weight of the binder.

3. A method for minimizing inherent yellowness in any clear automotive finish composition comprising adding a blue dye solution to the clear film composition in amounts so that a very small quantity of blue dye is present in said clear film composition in sufficient quantity that the blue dye results in a chroma neutralization of the inherent yellowness.

* * * * *